(12) United States Patent
Anderson (10) Patent No.: US 12,234,985 B2
(45) Date of Patent: Feb. 25, 2025

(54) OXY FOREHEARTH BURNER ASSEMBLY

(71) Applicant: Selas Heat Technology Company LLC, Streetsboro, OH (US)

(72) Inventor: Scott C. Anderson, Orlando, FL (US)

(73) Assignee: Selas Heat Technology Company LLC, Streetsboro, OH (US)

( * ) Notice: Subject to any disclaimer, the term of this patent is extended or adjusted under 35 U.S.C. 154(b) by 782 days.

(21) Appl. No.: 17/351,385

(22) Filed: Jun. 18, 2021

(65) Prior Publication Data

US 2021/0310652 A1 Oct. 7, 2021

Related U.S. Application Data

(63) Continuation of application No. PCT/US2018/067232, filed on Dec. 21, 2018.

(51) Int. Cl.
*F23D 14/22* (2006.01)
*F23D 14/32* (2006.01)
*F23D 14/48* (2006.01)

(52) U.S. Cl.
CPC ............. *F23D 14/22* (2013.01); *F23D 14/32* (2013.01); *F23D 14/48* (2013.01)

(58) Field of Classification Search
CPC ....................................................... F23D 4/38
USPC ........................... 431/355, 284, 353; 126/406
See application file for complete search history.

(56) References Cited

U.S. PATENT DOCUMENTS

| 1,791,565 A | * | 2/1931 | Killam | F23D 91/02 431/278 |
| 2,047,471 A | * | 7/1936 | Hepburn | F23C 3/002 126/91 A |
| 2,655,206 A | | 10/1953 | Eichelman | |
| 2,965,167 A | | 12/1960 | Campbell | |

(Continued)

FOREIGN PATENT DOCUMENTS

| CN | 101400947 A | 4/2009 |
| EP | 2063175 A1 | 5/2009 |

(Continued)

OTHER PUBLICATIONS

International Search Report and the Written Opinion of the International Searching Authority, International Patent Application No. PCT/US2018/067232, pp. 1-11, dated Mar. 22, 2019.

(Continued)

*Primary Examiner* — Vivek K Shirsat
(74) *Attorney, Agent, or Firm* — Bond, Schoeneck & King, PLLC (57) ABSTRACT

A burner assembly including a body, the body including a first aperture, a second aperture, a cavity between the first and second aperture, and a gas inlet in fluid communication with the cavity. The assembly also includes a gas nozzle arranged to terminate a first distance from the first aperture of the body. The assembly also includes a fuel tube and a fuel nozzle disposed within the cavity of the body, the fuel tube arranged to terminate within a first through-bore of the gas nozzle, and the fuel nozzle being removably secured to the fuel tube, the fuel nozzle terminating a second distance from the first aperture of the body, wherein the first distance is less than the second distance or the first distance is substantially equal to the second distance.

20 Claims, 6 Drawing Sheets

(56) References Cited

U.S. PATENT DOCUMENTS

| | | |
|---|---|---|
| 3,050,112 A | 8/1962 | Saunders et al. |
| 4,062,343 A * | 12/1977 | Spielman ............ F23D 17/002 126/91 A |
| 4,690,635 A | 9/1987 | Coppin |
| 4,761,132 A | 8/1988 | Khinkis |
| 4,909,727 A | 3/1990 | Khinkis |
| 4,986,748 A | 1/1991 | Brown et al. |
| 5,092,760 A | 3/1992 | Brown et al. |
| 5,199,866 A | 4/1993 | Joshi et al. |
| 5,222,447 A | 6/1993 | Joshi et al. |
| 5,251,823 A | 10/1993 | Joshi et al. |
| 5,256,058 A | 10/1993 | Slavejkov et al. |
| 5,346,390 A | 9/1994 | Slavejkov et al. |
| 5,431,559 A | 7/1995 | Taylor |
| 5,458,483 A | 10/1995 | Taylor |
| 5,490,775 A | 2/1996 | Joshi et al. |
| 5,500,030 A | 3/1996 | Joshi et al. |
| 5,547,368 A | 8/1996 | Slavejkov et al. |
| 5,567,141 A | 10/1996 | Joshi et al. |
| 5,725,367 A | 3/1998 | Joshi et al. |
| 5,814,121 A | 9/1998 | Travis |
| 5,823,769 A | 10/1998 | Joshi et al. |
| 5,934,899 A | 8/1999 | Joshi et al. |
| 6,176,702 B1 | 1/2001 | Mohr et al. |
| 6,210,151 B1 | 4/2001 | Joshi et al. |
| 6,233,974 B1 | 5/2001 | Anderson et al. |
| 6,345,979 B1 | 2/2002 | Taylor et al. |
| 6,843,185 B1 | 1/2005 | Taylor |
| 6,939,130 B2 | 9/2005 | Abbasi et al. |
| RE39,425 E | 12/2006 | Taylor |
| 8,784,096 B2 | 7/2014 | Mosiewicz |
| 9,822,967 B2 | 11/2017 | Taylor |
| 9,995,483 B2 | 6/2018 | Taylor |
| 2012/0003595 A1 | 1/2012 | Goh et al. |
| 2013/0143168 A1 | 6/2013 | Gangoli et al. |
| 2013/0143169 A1 | 6/2013 | Gangoli et al. |
| 2016/0025334 A1 | 1/2016 | Taylor et al. |
| 2016/0047545 A1 | 2/2016 | Anderson |
| 2019/0186731 A1 | 6/2019 | Taylor et al. |

FOREIGN PATENT DOCUMENTS

| | | |
|---|---|---|
| EP | 2965002 B1 | 5/2018 |
| EP | 2971956 B1 | 5/2018 |
| EP | 3502559 B1 | 3/2020 |
| GB | 739155 A | 10/1955 |
| GB | 1023354 | 3/1966 |
| GB | 1023354 A | 3/1966 |
| JP | 03-186111 A | 8/1991 |
| JP | 2004-294042 A | 10/2004 |
| JP | 2010-060189 A | 3/2010 |
| SE | 8303434 L | 6/1983 |
| WO | 1995016880 A2 | 6/1995 |

OTHER PUBLICATIONS

International Preliminary Report on Patentability, International Patent Application No. PCT/US2018/067232, pp. 1-9, dated Jun. 16, 2021.

The First Office Action, Chinese Patent Application No. 201880100646.3, dated Dec. 8, 2023, pp. 1-23, with pp. 1-14 being a translation.

Notice of Reasons for Rejection, Japanese Patent Application No. 2021-536257, pp. 1-7, with pp. 1-4 being a translation, dated Aug. 30, 2022.

Japanese Search Report dated Jul. 1, 2022, Japanese Patent Application No. 2021-536257, pp. 1-32, with pp. 1-21 being a translation.

The Second Office Action, Chinese Patent Application No. 201880100646.3, dated Nov. 1, 2024, pp. 1-14, with pp. 1-8 being a translation.

* cited by examiner

OXY FOREHEARTH BURNER ASSEMBLY

CROSS-REFERENCE TO RELATED APPLICATIONS

This application is a Continuation application under 35 U.S.C. § 111 (a) of International Patent Application No. PCT/US2018/067232, filed on Dec. 21, 2018, and titled "Oxy Forehearth Burner Assembly", which application is incorporated herein by reference in its entirety.

FIELD OF THE INVENTION

The present disclosure is directed generally to gas-fired burners, and more specifically, to forehearth burner assemblies having external combustion to provide improved burner efficiency.

BACKGROUND

Oxy-fuel combustion is the process of burning a fuel using oxygen as the primary oxidant instead of air. Use of oxy-fuel combustion lowers harmful environmental emissions as the nitrogen component of the air oxidant is not heated, reducing NOx emissions, as well as decreasing fuel consumption.

Forehearth burners are typically used for smaller burner applications (less than 50,000 BTU's) which are typically difficult to keep cool during operation. Additionally, traditional forehearth burners have a limited turndown ratio (e.g., 1:3-1:4), i.e., the ratio of the maximum operational output to minimum operational output, due to size and gas flow constraints. Moreover, forehearth burners typically use a pre-mixed air-fuel mixture, i.e., the mixture of oxidant and fuel, which mixes prior to or within the body of the forehearth burner. This pre-mixed air-fuel mixture within the assembly leads to undesirable results such as increased backfiring within the burner assembly, increased operational temperatures, and potentially decreased fuel/burner efficiency.

SUMMARY OF THE INVENTION

The present disclosure is directed generally to a forehearth burner assembly with nozzle-mixed oxy-fuel combustion. The burner assembly discussed herein includes a gas nozzle, a fuel tube, and a fuel nozzle where the arrangement of the gas nozzle and the fuel nozzle prevent mixing of a first gas and a first fuel until the first gas and the first fuel leave the assembly. Moreover, the burner assembly discussed herein has a wider turndown range than previous forehearth burners.

Generally, in an example, a burner assembly is provided including a body, the body including a first aperture, a second aperture, a cavity arranged between the first and second aperture, and a gas inlet in fluid communication with the cavity. The assembly also includes a gas nozzle having a first end, a second end terminating a first distance from the first aperture of the body, and a first through-bore arranged between the first end of the gas nozzle and the second end of the gas nozzle, the first end of the gas nozzle removably secured to the first aperture of the body. The assembly also includes a fuel tube disposed within the cavity of the body, the fuel tube having a first end removably secured to the second aperture, a second end arranged to terminate within the first through-bore of the gas nozzle, and a positioning member arranged proximate the second end of the fuel tube and arranged to position the fuel tube substantially concentric with the first through-bore of the gas nozzle. Moreover, the assembly includes a a fuel nozzle removably secured to the second end of the fuel tube, the fuel nozzle terminating a second distance from the first aperture of the body, wherein the first distance is less than the second distance.

In one aspect, the positioning member of the fuel tube comprises a first support member, a second support member, and a third support member.

In one aspect, the first support member, the second support member, and the third member are disposed about an outer surface of the fuel tube.

In one aspect, the first support member, the second support member, and the third support member are arranged substantially 120 degrees from each other about the outer surface of the fuel tube.

In one aspect, the assembly further includes a fourth support member, wherein the first support member, the second support member, the third support member, and the fourth support member are arranged substantially 90 degrees from each other about the outer surface of the fuel tube.

In one aspect, the fuel nozzle comprises a fuel nozzle body, the fuel nozzle body includes a first end, a second end, a first body portion proximate the first end of the fuel nozzle body, the first body portion having a first outer diameter, and a second body portion proximate the second end of the fuel nozzle body, the second body portion having a second outer diameter wherein the second outer diameter is smaller than the first outer diameter.

In one aspect, the fuel nozzle body further includes a second through-bore arranged between the first end of the fuel nozzle body and the second end of the fuel nozzle body, the second through-bore having a first portion proximate the first end of the fuel nozzle body, the first portion of the second through-bore having a first inner diameter; and the second through-bore having a second portion proximate the second end of the fuel nozzle body, the second portion of the second through-bore having a second inner diameter, where the first inner diameter is larger than the second inner diameter.

In one aspect, the fuel nozzle comprises a fuel nozzle body, the fuel nozzle body includes a first end, a second end, a first body portion proximate the first end of the fuel nozzle body, the first body portion having a first outer diameter, a second body portion proximate the second end of the fuel nozzle body, the second body portion having a second outer diameter, and a third body portion arranged between the first body portion of the fuel nozzle body and the second body portion of the fuel nozzle body, the third body portion having a third outer diameter wherein the first outer diameter is larger than the third outer diameter, and the third outer diameter is larger than the second outer diameter.

In one aspect, the fuel nozzle body further comprises a second through-bore arranged between the first end of the fuel nozzle body and the second end of the fuel nozzle body, the second through-bore having a first portion proximate the first end of the fuel nozzle body, the first portion of the second through-bore having a first inner diameter; and the second through-bore having a second portion proximate the second end of the fuel nozzle body, the second portion of the second through-bore having a second inner diameter, where the first inner diameter larger than the second inner diameter.

In one aspect, the fuel nozzle body further comprises a first outer transition surface, a second outer transition surface, and a first inner transition surface, the first outer transition surface arranged between the first body portion of the fuel nozzle body and the third body portion of the fuel nozzle body; the second outer transition surface arranged between the third body portion of the fuel nozzle body and the second body portion of the fuel nozzle body; and, the first inner transition surface arranged between the first portion of the second through-bore and the second portion of the second through-bore.

According to an embodiment, a burner assembly is provided, the burner assembly including a body, the body having a first aperture, a second aperture, a cavity arranged between the first and second aperture, and a gas inlet in fluid communication with the cavity. The assembly also includes a gas nozzle having a first end, a second end terminating a first distance from the first aperture of the body, and a first through-bore arranged between the first end of the gas nozzle and the second end of the gas nozzle, the first end of the gas nozzle removably secured to the first aperture of the body. The burner assembly further includes a fuel tube disposed within the cavity of the body, the fuel tube having a first end removably secured to the second aperture, a second end arranged to terminate within the first through-bore of the gas nozzle, and a positioning member arranged proximate the second end of the fuel tube and arranged to position the fuel tube substantially concentric with the first through-bore of the gas nozzle. Moreover, the burner assembly includes a fuel nozzle removably secured to the second end of the fuel tube, the fuel nozzle terminating a second distance from the first aperture of the body, wherein the first distance is equal to the second distance.

According to an embodiment, the positioning member of the fuel tube comprises a first support member, a second support member, and a third support member.

According to an embodiment, the first support member, the second support member, and the third member are disposed about an outer surface of the fuel tube.

According to an embodiment, the first support member, the second support member, and the third support member are arranged substantially 120 degrees from each other about the outer surface of the fuel tube.

According to an embodiment, the assembly further includes a fourth support member, wherein the first support member, the second support member, the third support member, and the fourth support member are arranged substantially 90 degrees from each other about the outer surface of the fuel tube.

According to an embodiment, the fuel nozzle comprises a fuel nozzle body, the fuel nozzle body includes a first end, a second end, a first body portion proximate the first end of the fuel nozzle body, the first body portion having a first outer diameter, and a second body portion proximate the second end of the fuel nozzle body, the second body portion having a second outer diameter wherein the second outer diameter is smaller than the first outer diameter.

According to an embodiment, the fuel nozzle body further includes a second through-bore arranged between the first end of the fuel nozzle body and the second end of the fuel nozzle body, the second through-bore having a first portion proximate the first end of the fuel nozzle body, the first portion of the second through-bore having a first inner diameter; and the second through-bore having a second portion proximate the second end of the fuel nozzle body, the second portion of the second through-bore having a second inner diameter, where the first inner diameter is larger than the second inner diameter.

According to an embodiment, the fuel nozzle comprises a fuel nozzle body, the fuel nozzle body includes a first end, a second end, a first body portion proximate the first end of the fuel nozzle body, the first body portion having a first outer diameter, a second body portion proximate the second end of the fuel nozzle body, the second body portion having a second outer diameter, and a third body portion arranged between the first body portion of the fuel nozzle body and the second body portion of the fuel nozzle body, the third body portion having a third outer diameter wherein the first outer diameter is larger than the third outer diameter, and the third outer diameter is larger than the second outer diameter.

According to an embodiment, the fuel nozzle body further includes a second through-bore arranged between the first end of the fuel nozzle body and the second end of the fuel nozzle body, the second through-bore having a first portion proximate the first end of the fuel nozzle body, the first portion of the second through-bore having a first inner diameter; and the second through-bore having a second portion proximate the second end of the fuel nozzle body, the second portion of the second through-bore having a second inner diameter, where the first inner diameter larger than the second inner diameter.

According to an embodiment, the fuel nozzle body further includes a first outer transition surface, a second outer transition surface, and a first inner transition surface, the first outer transition surface arranged between the first body portion of the fuel nozzle body and the third body portion of the fuel nozzle body; the second outer transition surface arranged between the third body portion of the fuel nozzle body and the second body portion of the fuel nozzle body; and, the first inner transition surface arranged between the first portion of the second through-bore and the second portion of the second through-bore.

BRIEF DESCRIPTION OF THE DRAWINGS

The foregoing will be apparent from the following more particular description of example embodiments of the present disclosure, as illustrated in the accompanying drawings in which like reference characters refer to the same parts throughout the different views. The drawings are not necessarily to scale, emphasis instead being placed upon illustrating embodiments of the present disclosure.

DETAILED DESCRIPTION OF EMBODIMENTS

The present disclosure is directed generally to a forehearth burner assembly with nozzle-mixed oxy-fuel combustion. The burner assembly embodiments discussed herein include a gas nozzle, a fuel tube, and a fuel nozzle where the arrangement of the gas nozzle and the fuel nozzle prevent mixing of a first gas and a first fuel until the first gas and the first fuel leave the assembly. Moreover, the burner assemblies discussed herein have a wider turndown range than previous forehearth burners.

A description of example embodiments of the present disclosure follows. Although the burner assembly shown in the figures is shown in an upward orientation, the description of the assembly shown in the figures is not intended to be limited to a particular orientation.

Figure 1:
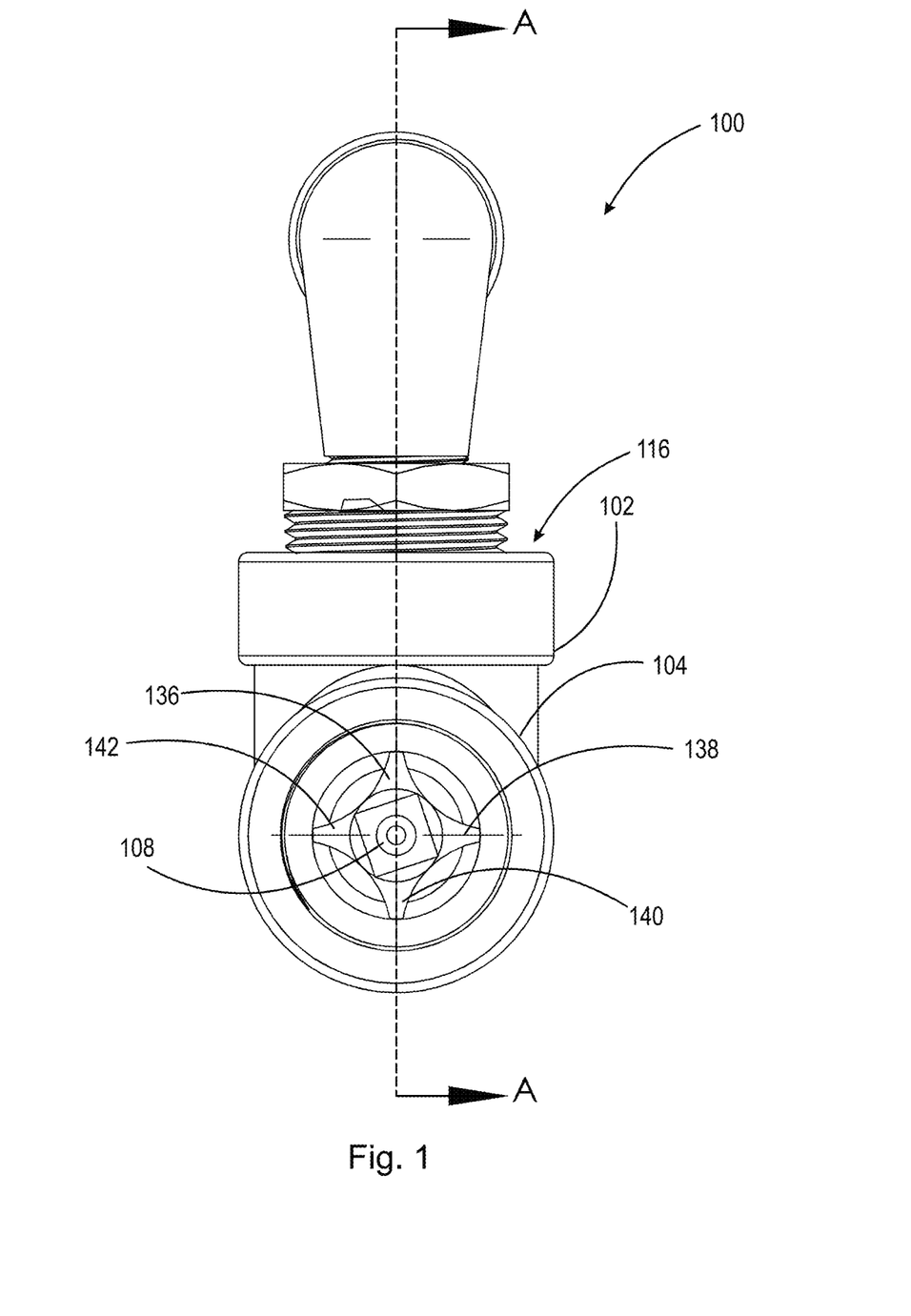
FIG. 1 is a front elevational view of a burner assembly according to the present disclosure.

Referring to FIG. 1, FIG. 1 illustrates a front elevational view of burner assembly 100 according to the present disclosure.

Figure 2:
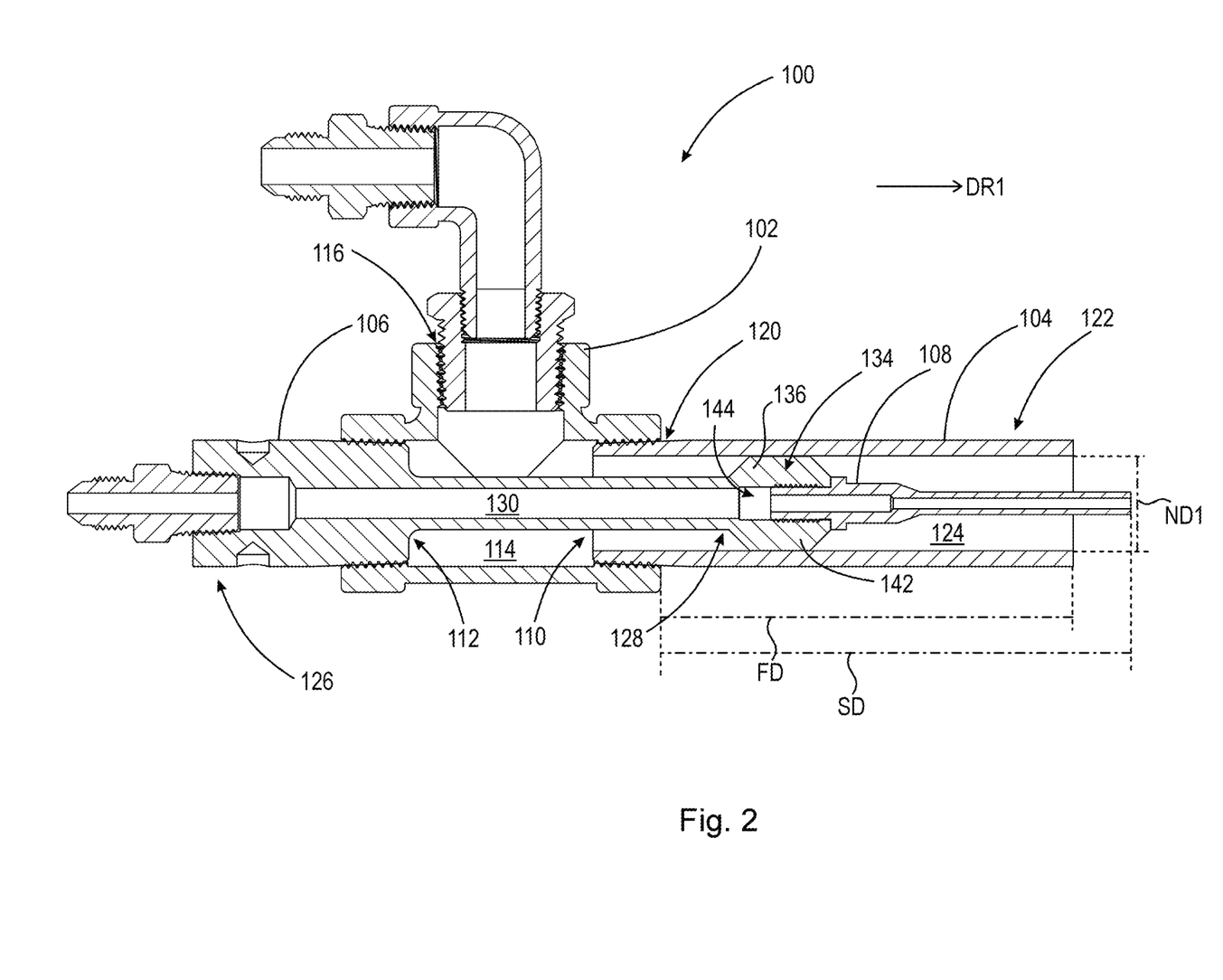
FIG. 2 is a cross-sectional view taken generally along line A-A in FIG. 1, according to the present disclosure.

The following description should be read in view of FIGS. 1 and 2. FIG. 2 illustrates burner assembly 100 in a cross-sectional view taken generally along line A-A in FIG. 1. As shown in FIG. 2, burner assembly 100 includes body 102, gas nozzle 104, fuel tube 106, and fuel nozzle 108. Body 102 includes first aperture 110, second aperture 112, cavity 114, and gas inlet 116. In one example embodiment, body 102 is made from stainless steel and is substantially hollow. In another example embodiment, body 102 is a ¾ inch stainless steel tee. In one example embodiment, body 102 is formed in the shape of an upside-down "T", i.e., a T-junction where first aperture 110, second aperture 112, and gas inlet 116 form the points of the "T" shape connected by cavity 114. First aperture 110 of body 102 is operatively arranged to receive gas nozzle 104; second aperture 112 is operatively arranged to receive fuel tube 106; and, gas inlet 116 is operatively arranged to connect with a gas source (not shown), i.e., a supply of first gas 118 (shown in FIG. 6). First aperture 110 and second aperture 112 each have an inner circumferential surface having threads machined thereon. These threads can have various thread counts, i.e., threads per inch, and can vary from a low thread count having the advantage of being cheaper to manufacture at the cost of precision to having a high thread count having the advantage of high precision with the disadvantage of increase cost of manufacturing.

Although illustrated as an aperture centered about body 102, it should be appreciated that gas inlet 116 can take any form sufficient to provide the appropriate volume of first gas 118 (shown in FIG. 6) into body 102 and subsequently into gas nozzle 104. In one example embodiment, first gas 118 is oxygen or a gaseous mixture containing a substantial portion of oxygen. It should be appreciated that other gaseous mixtures could be utilized, e.g., gaseous mixtures comprising oxygen or any other gaseous oxidant that supports combustion processes.

Gas nozzle 104 includes first end 120 and second end 122. First end 120 has an outer circumferential surface having threads machined thereon. The threads on the outer circumferential surface of first end 120 of gas nozzle 104 are arranged to engage with the threads on the inner circumferential surface of first aperture 110 of body 102. These threads can have various thread counts, i.e., threads per inch, and can vary from a low thread count having the advantage of being cheaper to manufacture at the cost of precision to having a high thread count having the advantage of high precision with the disadvantage of increase cost of manufacturing. Second end 122 of gas nozzle 104 is arranged such that it terminates, or ends, at a first distance FD measured from first aperture 110 in first direction DR1 with respect to body 102. It should be appreciated that the threads on the outer circumferential surface of first end 120 of gas nozzle 104 are arranged such that a precise distance, i.e., first distance FD from first aperture 110 can be set. Additionally, gas nozzle 104 further includes a through-bore, i.e., first through-bore 124 arranged to extend along the length of gas nozzle 104 from first end 120 to second end 122. First through-bore 124 has a first nozzle diameter ND1 such that first gas 118 (shown in FIG. 6) entering cavity 114 of body 102 via gas inlet 116 can flow through first through-bore 124 and out of second end 122. The flow of first gas 118 (shown in FIG. 6) is intended to be within the range of 0.5-10.0 ft/s.

Fuel tube 106 includes first end 126 and second end 128. First end 126 has an outer circumferential surface having threads machined thereon. The threads on the outer circumferential surface of first end 126 of fuel tube 106 are arranged to engage with the threads on the inner circumferential surface of second aperture 112 of body 102. These threads can have various thread counts, i.e., threads per inch, and can vary from a low thread count having the advantage of being cheaper to manufacture at the cost of precision to having a high thread count having the advantage of high precision with the disadvantage of increase cost of manufacturing. Fuel tube 106 further includes second through-bore 130 arranged within fuel tube 106 and between first end 126 and second end 128 of fuel tube 106. Additionally, first end 126 of fuel tube 106 is arranged to be in fluid communication with a fuel source (not shown), e.g., a source of first fuel 132 (shown in FIG. 6). First fuel 132 (shown in FIG. 6) can be selected from: Methane, Propane, Butane, Hydrogen, Natural Gas, Carbon Monoxide, or any other gaseous fuel capable of auto-ignition at high temperatures. Second through-bore 130 is arranged such that first fuel 132 (shown in FIG. 6) can flow through second through-bore 130 and out of second end 128. Fuel tube 106, when engaged with second aperture 112 of body 102, is intended to be disposed substantially within cavity 114 of body 102 and concentric with gas nozzle 104.

Second end 128 further includes positioning member 134. Positioning member 134 is intended to suspend, orient, and/or center fuel tube 106 substantially concentric with the inner circumferential surface of first through-bore 124. Positioning member 134 includes a plurality of support members extending radially outward from an outer circumferential surface of fuel tube 106, where each of the plurality of support members contact and engage with the inner circumferential surface of first through-bore 124. The plurality of support members includes first support member 136, second support member 138 (shown in FIG. 1), third support member 140 (shown in FIG. 1), and optionally, a fourth support member 142. In one example, positioning member 134 includes three support members, i.e., first support member 136, second support member 138 (shown in FIG. 1), and third support member 140 (shown in FIG. 1) each extending radially from, and equally spaced about, the outer circumferential surface of fuel tube 106, i.e., substantially spaced apart 120 degrees from each other about the outer circumferential surface of fuel tube 106. In one example, positioning member 134 includes four support members, i.e., first support member 136, second support member 138 (shown in FIG. 1), third support member 140 (shown in FIG. 1), and fourth support member 142 each extending radially from, and equally spaced about, the outer circumferential surface of fuel tube 106, i.e., substantially spaced apart 90 degrees from each other about the outer circumferential surface of fuel tube 106. It should be appreciated that any configuration of radially extending support members sufficient to suspend fuel tube 106 substantially concentric with first through-bore 124 is contemplated herein.

Additionally, the second end 128 of fuel tube 106 has an aperture arranged to receive fuel nozzle body 146 of fuel nozzle 108, i.e., third aperture 144. Third aperture 144 has an inner circumferential surface arranged to engage with first end 148 of fuel nozzle body 146 as discussed below. The inner circumferential surface of third aperture 144 has machined threads arranged thereon. Again, these threads can have various thread counts, i.e., threads per inch, and can vary from a low thread count having the advantage of being cheaper to manufacture at the cost of precision to having a high thread count having the advantage of high precision with the disadvantage of increase cost of manufacturing. It should be appreciated that this threaded connection will allow for ease of replacement of fuel nozzle 108 in the event that it is damaged or a particular application requires a different nozzle diameter or length.

The following should be read in view of FIGS. 2 and 3A-3C. Fuel nozzle 108 has a fuel nozzle body 146 (shown in FIG. 3A). Fuel nozzle body 146 (shown in FIG. 3A) has first end 148 and second end 150. First end 148 of fuel nozzle body 146 is arranged to engage with and be removably secured to third aperture 144 of second end 128 of fuel tube 106. Fuel nozzle body 146 further includes third through-bore 152 which is substantially concentric with second through-bore 130 of fuel tube 106. As will be discussed below, third through-bore 152 terminates at second end 150 of fuel nozzle body 146 and has a second nozzle diameter ND2. Second nozzle diameter ND2 is selected such that first fuel 132 (shown in FIG. 6) can flow through second through-bore 130 and third through-bore 152 and out of second end 150 of fuel nozzle body 146. The flow rate of first fuel 132 (shown in FIG. 6) is intended to be within the range of 30.0-330.0 ft/s.

When first end 148 of fuel nozzle body 146 is engaged with third aperture 144 of fuel tube 106, and first end 126 of fuel tube 106 is engaged with second aperture 112 of body 102, second end 150 of fuel nozzle body 146 is arranged to terminate, or end, a second distance SD from first aperture 110. In one example embodiment, first distance FD is less than second distance SD. In other words, second end 150 of fuel nozzle body 146 extends past second end 122 of gas nozzle 104. In one example, second distance SD is between 0.0-1.0 inches greater than first distance FD. This arrangement prevents mixing and ignition of first gas 118 (shown in FIG. 6) and first fuel 132 (shown in FIG. 6) until both first gas 118 (shown in FIG. 6) and first fuel 132 (shown in FIG. 6) are outside of the burner assembly, i.e., proximate mixing area 174 (shown in FIG. 6). It should be appreciated that, in a preferred embodiment, gas nozzle 104 and fuel nozzle 108 are made from stainless steel or bored from solid stock stainless steel and machined. Previous forehearth burners utilize Inconel material for its ability to withstand higher operating temperatures; however, with the benefits of the present burner assembly, the nozzle can be made from stainless steel as the combustion takes place substantially, or completely, outside of the gas nozzle 104. In one example embodiment, gas nozzle 104 is made from 303 or 304 grade stainless steel and fuel nozzle is made from 310 grade stainless steel. Thus, one potential advantage over previous assemblies is that, as steel is cheaper to obtain and machine, the assembly discussed in the present disclosure is cheaper to manufacture than previous versions using Inconel.

Figure 3A:
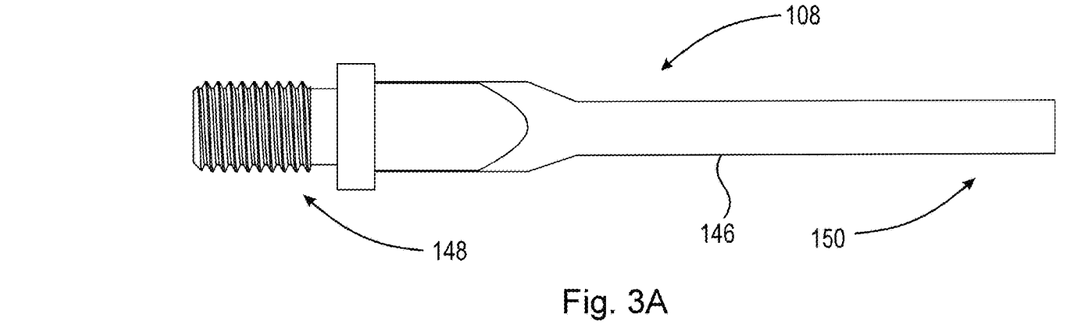
FIG. 3A is a side elevational view of a fuel nozzle according to the present disclosure.
Figure 3B:
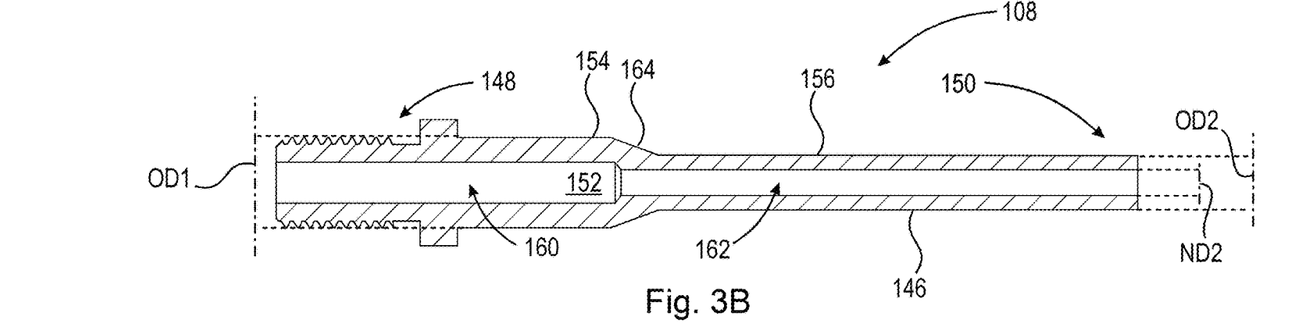
FIG. 3B is a cross-sectional view of the fuel nozzle illustrated in FIGS. 2 and 3A.
Figure 3C:
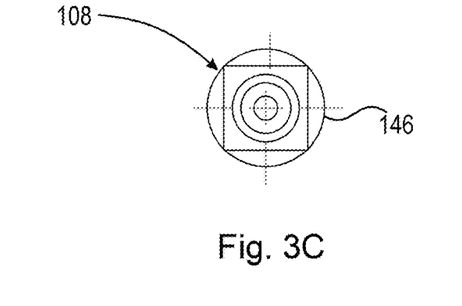
FIG. 3C is a front view of the fuel nozzle illustrated in FIGS. 2 and 3A.

FIGS. 3A-3C illustrate a side elevational view, a cross-sectional side elevational view, and a front view of fuel nozzle 108, respectively, according to the present disclosure. FIG. 3C is taken from the perspective of second end 150 of fuel nozzle body 146. As can be seen in FIGS. 3A-3C, in one example of fuel nozzle 108, fuel nozzle body 146 includes at least first body portion 154 and second body portion 156. First body portion 154 is arranged proximate first end 148 of fuel nozzle body 146 and has a first outer diameter OD1. Second body portion 156 is arranged proximate second end 150 of fuel nozzle body 146 and has a second outer diameter OD2. Between first body portion 154 and second body portion 156 there is a first outer transition surface 164 which transitions the outer surface of fuel nozzle body 146 from first outer diameter OD1 to second outer diameter OD2.

Third through-bore 152 of fuel nozzle body 146 further includes a first portion 160 and a second portion 162. First portion 160 of third through-bore 152 is arranged proximate first end 148 of fuel nozzle body 146, and second portion 162 of third through-bore 152 is arranged proximate second end 150 of fuel nozzle body 146. First portion 160 of third through-bore 152 has a first inner diameter ID1 (not shown) and second portion 162 of third through-bore 152 has a second inner diameter ID2 (not shown). Between first portion 160 and second portion 162 of third through-bore 152 there is a first inner transition surface 168 which transitions the inner surface of third through-bore 152 from first inner diameter ID1 (not shown) to second inner diameter ID2 (not shown).

Figure 4:
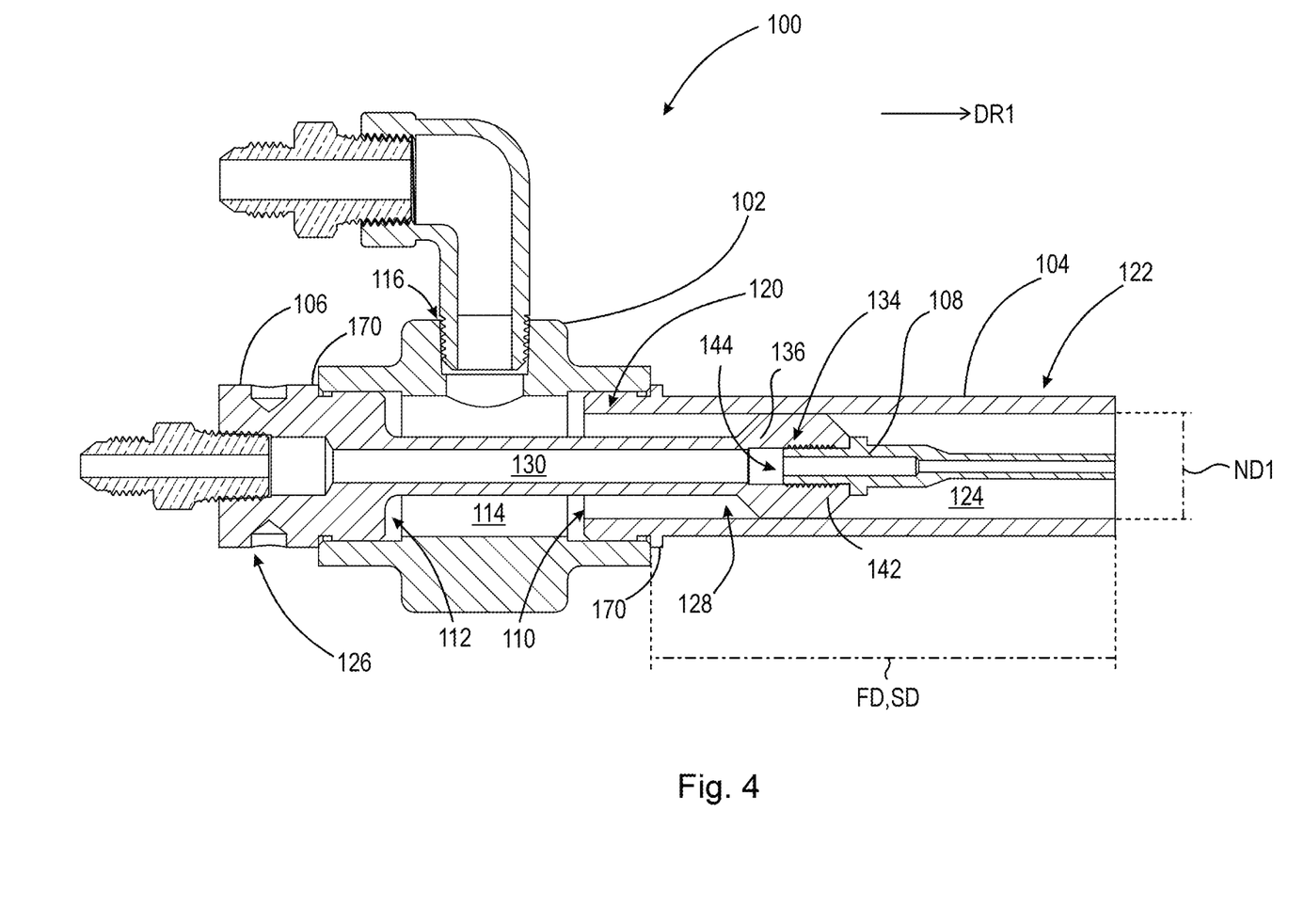
FIG. 4 is a cross-sectional view taken generally along line A-A in FIG. 1, according to the present disclosure.

FIG. 4 illustrates an example embodiment of burner assembly 100 according to the present disclosure. The embodiment illustrated in FIG. 4 is substantially similar to the embodiment illustrated in FIG. 2, with a few alterations. For example, FIG. 4 illustrates that first end 120 of gas nozzle 104 can further include a stop 170 arranged to prevent further rotational engagement of the threads previously described within the inner circumferential surface of first aperture 110. Similarly, first end 126 of fuel tube 106 also has a stop 170 arranged to prevent further rotational engagement of the threads previously described on the inner circumferential surface of second aperture 112. Stop(s) 170 create a precise stopping point for both gas nozzle 104 and fuel tube 106 such that the first distance FD and second distance SD can be set with high precision. Additionally, although not illustrated, it should be appreciated that the connection between gas nozzle 104 and first aperture 110, and the connection between fuel tube 106 and second aperture 112 can be threaded. Moreover, FIG. 4 also illustrates that gas nozzle 104 and fuel nozzle 108 can co-terminate an equal distance from first aperture 110 of body 102, i.e., first distance FD and second distance SD are substantially equal. This arrangement also allows for external mixing of first gas 118 and first fuel 132 outside of gas nozzle 104.

Figure 5A:
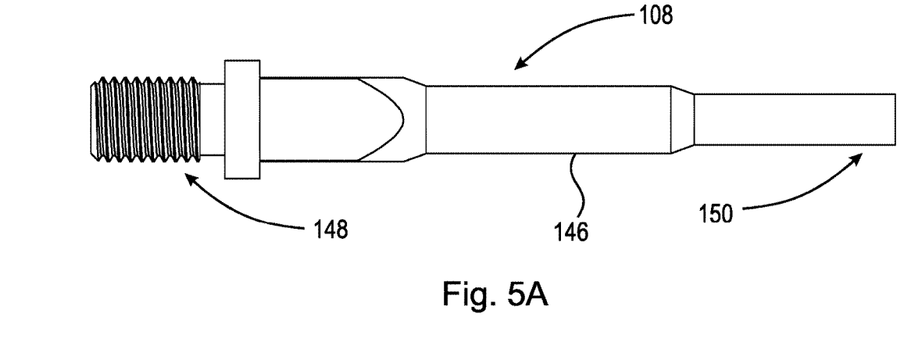
FIG. 5A is a side elevational view of a fuel nozzle according to the present disclosure.
Figure 5B:
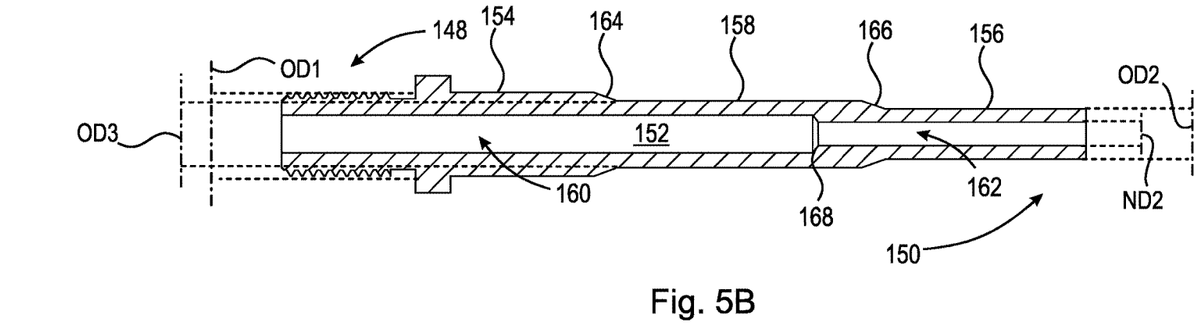
FIG. 5B is a cross-sectional view of the fuel nozzle illustrated in FIG. 5A.
Figure 5C:
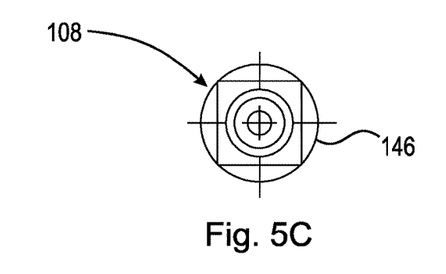
FIG. 5C is a front view of the fuel nozzle illustrated in FIG. 5A.

FIGS. 5A-5C illustrate an example embodiment of fuel nozzle 108 having fuel nozzle body 146. As shown in FIGS. 5A-5C, fuel nozzle body 146 can include first body portion 154, second body portion 156, and third body portion 158. First body portion 154 is arranged proximate first end 148 of fuel nozzle body 146 and has a first outer diameter OD1. Second body portion 156 is arranged proximate second end 150 of fuel nozzle body 146 and has a second outer diameter OD2. Third body portion 158 is arranged between first body portion 154 and second body portion 156 and has a third outer diameter OD3, where OD3 is less than OD1 and greater than OD2. Between first body portion 154 and third body portion 158 there is a first outer transition surface 164 which transitions the outer surface of fuel nozzle body 146 from first outer diameter OD1 to third outer diameter OD3. Between third body portion 158 and second body portion 156 there is a second outer transition surface 166 which transitions the outer surface of fuel nozzle body 146 from third outer diameter OD3 to second outer diameter OD2.

Additionally, third through-bore 152 of fuel nozzle body 146 further includes a first portion 160 and a second portion 162. First portion 160 of third through-bore 152 is arranged proximate first end 148 of fuel nozzle body 146, and second portion 162 of third through-bore 152 is arranged proximate second end 150 of fuel nozzle body 146. First portion 160 of third through-bore 152 has a first inner diameter ID1 (not shown) and second portion 162 of third through-bore 152 has a second inner diameter ID2 (not shown). Between first portion 160 and second portion 162 of third through-bore 152 there is a first inner transition surface 168 which transitions the inner surface of third through-bore 152 from first inner diameter ID1 (not shown) to second inner diameter ID2 (not shown).

Figure 6:
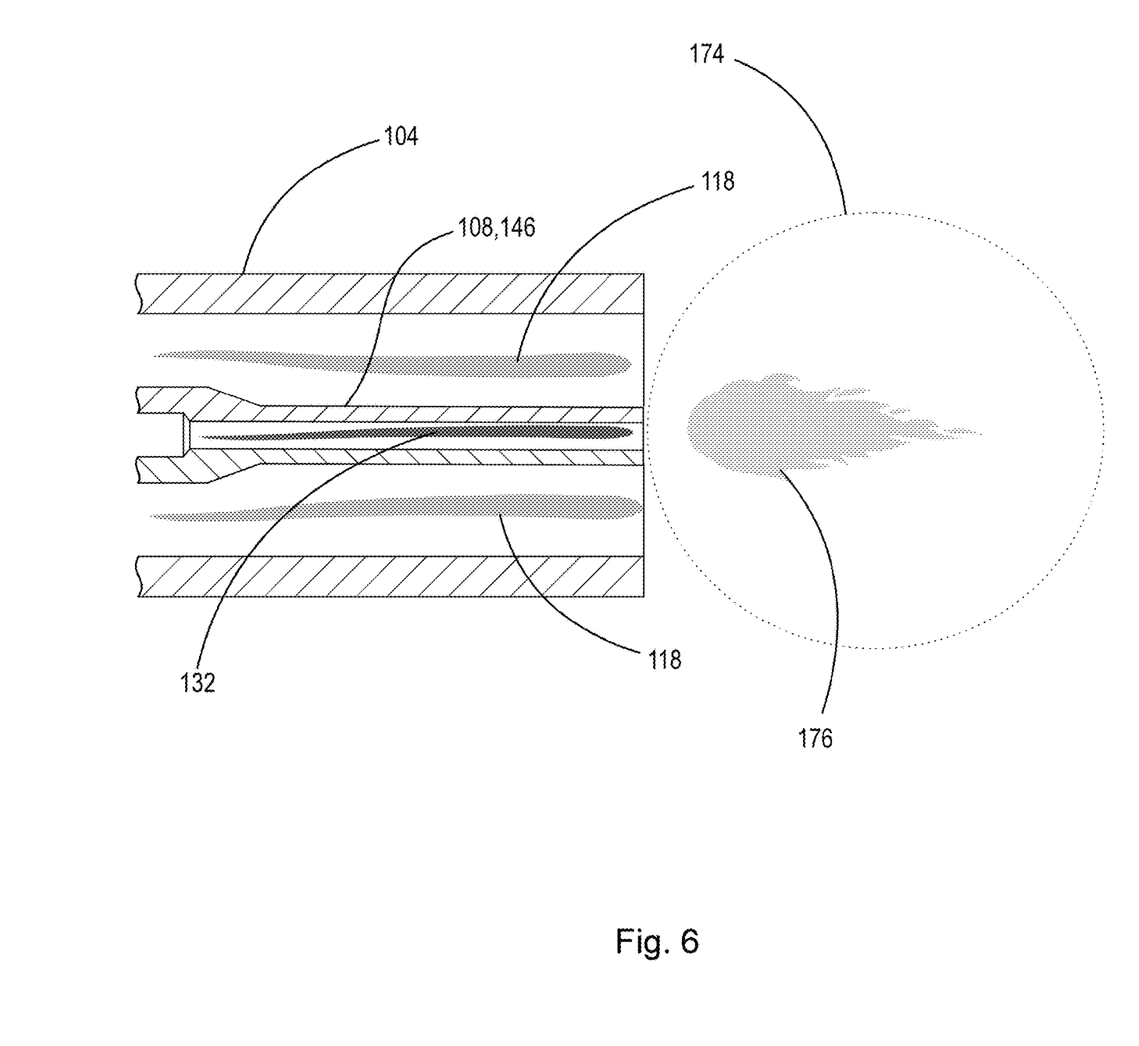
FIG. 6 is a partial cross-sectional view of the fuel nozzle illustrated in FIG. 4 according to an embodiment of the present disclosure.

FIG. 6 illustrates a partial cross-sectional view of burner assembly 100 illustrated in FIG. 4 during operation. The following example description should be read in view of FIGS. 1-6. During operation, a first gas source connected to gas inlet 116 provides first gas 118 which flows through gas inlet 116 into cavity 114 of body 102 of burner assembly 100. Cavity 114 is sufficiently voluminous to accept first gas 118 and redirect it through first aperture 110, around the volume taken up by fuel tube 106 and fuel nozzle 108, into first end 120 of gas nozzle 104, along first through-bore 124 of gas nozzle 104, and out of second end 122 of gas nozzle 104. Simultaneously, a fuel source (not shown) connected to fuel tube 106 provides first fuel 132 which flows from first end 126 of fuel tube 106, through second through-bore 130, to second end 128 of fuel tube 106, into third through-bore 152 of fuel nozzle 108 and out into mixing area 174. Once first gas 118 and first fuel 132 mix, the temperature experienced in mixing area 174 is sufficient for auto-ignition of the gas-fuel mixture, which creates the combustion 176 for the burner assembly. Importantly, due to the position of the external mixing area 174, several advantages are realized. First, as the gas does not mix within gas nozzle 104, this arrangement experiences less misfires/backfires. Additionally, as combustion is taking place outside of the burner assembly, the entire assembly, including the gas nozzle 104, experiences reduced operating temperatures and decreasing overall failure rate of the assembly. It should be appreciated that, although not shown, an ignitor can be provided such that combustion 176 does not rely on auto-ignition as described herein.

As discussed above, the flow rate of first gas 118 is intended to range from 0.5-10.0 ft/s. The flow rate of first fuel 132 is intended to range from 17.5-450.0 ft/s. Thus there is a ratio of between 1:35-1:45 in the flow rate of the first gas 118 and the flow rate of the first fuel 132. This difference in flow rate allows for the wider/broader turndown ratio during operation, e.g., 10:1 as opposed to previous burners where the ratio is closer to 3:1 or 4:1. This difference in flow rate is a result of the difference in diameters at the end of gas nozzle 104 and the end of the fuel nozzle 108. The flow rate of first fuel 132 is dependent on the diameter of the second end 150 of fuel nozzle body 146. The flow rate of first gas 118 is dependent on the diameter of the second end 122 of gas nozzle 104 subtracted by the diameter of the second end 150 of fuel nozzle body 146.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

What is claimed is:

1. A burner assembly, comprising:
   a body, the body comprising:
      a first aperture;
      a second aperture;
      a cavity arranged between the first and second aperture; and
      a gas inlet in fluid communication with the cavity; and
   a gas nozzle comprising:
      a first end removably secured to the first aperture of the body;
      a second end terminating a first distance from the first aperture of the body; and
      a first through-bore arranged between the first end of the gas nozzle and the second end of the gas nozzle; and
   a fuel tube disposed within the cavity of the body, the fuel tube comprising:
      a first end removably secured to the second aperture;
      a second end arranged to terminate between the first end and the second end of the gas nozzle; and
      a positioning member arranged proximate the second end of the fuel tube and arranged to position the fuel tube substantially concentric with the first through-bore of the gas nozzle; and
   a fuel nozzle removably secured to the second end of the fuel tube, the fuel nozzle terminating a second distance from the first aperture of the body, wherein the first distance is less than the second distance.

2. The burner assembly recited in claim 1, wherein the positioning member of the fuel tube comprises a first support member, a second support member, and a third support member.

3. The burner assembly recited in claim 2, wherein the first support member, the second support member, and the third support member are disposed about an outer surface of the fuel tube.

4. The burner assembly recited in claim 3, wherein the first support member, the second support member, and the third support member are arranged substantially 120 degrees from each other about the outer surface of the fuel tube.

5. The burner assembly recited in claim 3, further comprising a fourth support member, wherein the first support member, the second support member, the third support member, and the fourth support member are arranged substantially 90 degrees from each other about the outer surface of the fuel tube.

6. The burner assembly recited in claim 1, wherein the fuel nozzle comprises a fuel nozzle body, the fuel nozzle body comprising:
   a first end;
   a second end;
   a first body portion proximate the first end of the fuel nozzle body, the first body portion having a first outer diameter; and
   a second body portion proximate the second end of the fuel nozzle body, the second body portion having a second outer diameter;
   wherein the second outer diameter is smaller than the first outer diameter.

7. The burner assembly recited in claim 6, wherein the fuel nozzle body further comprises a second through-bore arranged between the first end of the fuel nozzle body and the second end of the fuel nozzle body, the second through-bore having a first portion proximate the first end of the fuel nozzle body, the first portion of the second through-bore having a first inner diameter; and the second through-bore having a second portion proximate the second end of the fuel nozzle body, the second portion of the second through-bore having a second inner diameter, where the first inner diameter is larger than the second inner diameter.

8. The burner assembly recited in claim 1, wherein the fuel nozzle comprises a fuel nozzle body, the fuel nozzle body comprising:
   a first end;
   a second end;
   a first body portion proximate the first end of the fuel nozzle body, the first body portion having a first outer diameter;
   a second body portion proximate the second end of the fuel nozzle body, the second body portion having a second outer diameter; and
   a third body portion arranged between the first body portion of the fuel nozzle body and the second body portion of the fuel nozzle body, the third body portion having a third outer diameter;
   wherein the first outer diameter is larger than the third outer diameter, and the third outer diameter is larger than the second outer diameter.

9. The burner assembly recited in claim 8, wherein the fuel nozzle body further comprises a second through-bore arranged between the first end of the fuel nozzle body and the second end of the fuel nozzle body, the second through-bore having a first portion proximate the first end of the fuel nozzle body, the first portion of the second through-bore having a first inner diameter; and the second through-bore having a second portion proximate the second end of the fuel nozzle body, the second portion of the second through-bore having a second inner diameter, where the first inner diameter is larger than the second inner diameter.

10. The burner assembly recited in claim 9, wherein the fuel nozzle body further comprises a first outer transition surface, a second outer transition surface, and a first inner transition surface, the first outer transition surface arranged between the first body portion of the fuel nozzle body and the third body portion of the fuel nozzle body; the second outer transition surface arranged between the third body portion of the fuel nozzle body and the second body portion of the fuel nozzle body; and, the first inner transition surface arranged between the first portion of the second through-bore and the second portion of the second through-bore.

11. A burner assembly, comprising:
   a body, the body comprising:
      a first aperture;
      a second aperture;
      a cavity arranged between the first and second aperture; and
      a gas inlet in fluid communication with the cavity; and
   a gas nozzle comprising:
      a first end removably secured to the first aperture of the body;
      a second end terminating a first distance from the first aperture of the body; and
      a first through-bore arranged between the first end of the gas nozzle and the second end of the gas nozzle; and
   a fuel tube disposed within the cavity of the body, the fuel tube comprising:
      a first end removably secured to the second aperture;
      a second end arranged to terminate within the first through-bore of the gas nozzle; and
      a positioning member arranged proximate the second end of the fuel tube and arranged to position the fuel tube substantially concentric with the first through-bore of the gas nozzle; and
   a fuel nozzle removably secured to the second end of the fuel tube, the fuel nozzle terminating a second distance from the first aperture of the body, wherein the first distance is equal to the second distance, the fuel nozzle comprising a fuel nozzle body, the fuel nozzle body comprising:
      a first end;
      a second end;
      a first body portion proximate the first end of the fuel nozzle body, the first body portion having a first outer diameter; and
      a second body portion proximate the second end of the fuel nozzle body, the second body portion having a second outer diameter;
      wherein the second outer diameter is smaller than the first outer diameter.

12. The burner assembly recited in claim 11, wherein the positioning member of the fuel tube comprises a first support member, a second support member, and a third support member.

13. The burner assembly recited in claim 12, wherein the first support member, the second support member, and the third support member are disposed about an outer surface of the fuel tube.

14. The burner assembly recited in claim 13, wherein the first support member, the second support member, and the third support member are arranged substantially 120 degrees from each other about the outer surface of the fuel tube.

15. The burner assembly recited in claim 13, further comprising a fourth support member, wherein the first support member, the second support member, the third support member, and the fourth support member are arranged substantially 90 degrees from each other about the outer surface of the fuel tube.

16. The burner assembly recited in claim 11, wherein the fuel nozzle body further comprises a second through-bore arranged between the first end of the fuel nozzle body and the second end of the fuel nozzle body, the second through-bore having a first portion proximate the first end of the fuel nozzle body, the first portion of the second through-bore having a first inner diameter; and the second through-bore having a second portion proximate the second end of the fuel nozzle body, the second portion of the second through-bore having a second inner diameter, where the first inner diameter is larger than the second inner diameter.

17. The burner assembly recited in claim 11, wherein the fuel nozzle body further comprises:
- a third body portion arranged between the first body portion of the fuel nozzle body and the second body portion of the fuel nozzle body, the third body portion having a third outer diameter;
- wherein the first outer diameter is larger than the third outer diameter, and the third outer diameter is larger than the second outer diameter.

18. The burner assembly recited in claim 11, wherein the fuel nozzle body further comprises a second through-bore arranged between the first end of the fuel nozzle body and the second end of the fuel nozzle body, the second through-bore having a first portion proximate the first end of the fuel nozzle body, the first portion of the second through-bore having a first inner diameter; and the second through-bore having a second portion proximate the second end of the fuel nozzle body, the second portion of the second through-bore having a second inner diameter, where the first inner diameter is larger than the second inner diameter.

19. The burner assembly recited in claim 17, wherein the fuel nozzle body further comprises a first outer transition surface, a second outer transition surface, and a first inner transition surface, the first outer transition surface arranged between the first body portion of the fuel nozzle body and the third body portion of the fuel nozzle body; the second outer transition surface arranged between the third body portion of the fuel nozzle body and the second body portion of the fuel nozzle body; and, the first inner transition surface arranged between the first portion of the second through-bore and the second portion of the second through-bore.

20. The burner assembly of claim 1, wherein the second end of the gas nozzle comprises a first nozzle diameter, the fuel tube further comprises a second through-bore arranged between the first end of the fuel tube and the second end of the fuel tube, and the fuel nozzle further comprises:
- a first end;
- a second end; and
- a third through-bore arranged between the first end of the fuel nozzle and the second end of the fuel nozzle, the second end of the fuel nozzle having a second nozzle diameter, wherein the first nozzle diameter is larger than the second nozzle diameter so as to cause a turndown ratio of approximately 10:1 during operation.

* * * * *